United States Patent
Kobayashi et al.

(10) Patent No.: US 8,525,655 B2
(45) Date of Patent: Sep. 3, 2013

(54) VEHICLE CONTROL SYSTEM

(75) Inventors: Masahiro Kobayashi, Ebina (JP); Youji Hamaguchi, Zama (JP); Takuya Inoue, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 343 days.

(21) Appl. No.: 13/056,442

(22) PCT Filed: Jun. 4, 2009

(86) PCT No.: PCT/JP2009/060222
§ 371 (c)(1),
(2), (4) Date: Jan. 28, 2011

(87) PCT Pub. No.: WO2010/013542
PCT Pub. Date: Feb. 4, 2010

(65) Prior Publication Data
US 2011/0175714 A1    Jul. 21, 2011

(30) Foreign Application Priority Data

Jul. 30, 2008   (JP) ................................ 2008 196599

(51) Int. Cl.
*B60Q 1/00*   (2006.01)
*G08G 1/00*   (2006.01)
*G01C 22/00*  (2006.01)

(52) U.S. Cl.
USPC ........... 340/435; 340/436; 340/437; 340/438; 340/901; 340/932.2; 701/28; 701/70; 701/117; 701/300

(58) Field of Classification Search
USPC .............. 340/435, 436, 903, 932.2, 437, 438, 340/549, 901, 937; 701/28, 36, 41, 45, 70, 701/117, 216, 300, 301; 348/118, 119, 148; 382/104, 284, 294; 180/167, 175, 199, 204
See application file for complete search history.

(56) References Cited

U.S. PATENT DOCUMENTS

| | | | |
|---|---|---|---|
| 5,450,057 A | | 9/1995 | Watanabe |
| 6,070,682 A | * | 6/2000 | Isogai et al. ............ 180/167 |
| 6,275,754 B1 | * | 8/2001 | Shimizu et al. ............ 701/41 |
| 6,476,730 B2 | * | 11/2002 | Kakinami et al. ......... 340/932.2 |
| 6,784,791 B2 | * | 8/2004 | Rao et al. ............ 340/435 |
| 7,385,486 B2 | * | 6/2008 | Danz et al. ............ 340/435 |

(Continued)

FOREIGN PATENT DOCUMENTS

| | | |
|---|---|---|
| CN | 1041322 A | 4/1990 |
| CN | 1954351 A | 4/2007 |

(Continued)

*Primary Examiner* — Daniel Wu
*Assistant Examiner* — Mancil Littlejohn
(74) *Attorney, Agent, or Firm* — Foley & Lardner LLP

(57) ABSTRACT

In the case that a vehicle 1 is making a reverse movement, a control section 4 sets a braking control operation distance according to an angle formed by the vehicle 1's proceeding direction and an extending direction of a road on which an approaching vehicle is traveling. With this, a braking control is implemented at a delayed timing in a scene where the following possibility is high: the driver wishes to end the reverse movement operation as early as possible when a space for allowing the approaching vehicle to pass by is not present at the back of the vehicle 1. Thereby, the cumbersomeness or discomfort which may be felt by the driver with respect to the braking control can be decreased.

11 Claims, 7 Drawing Sheets

(56) References Cited

U.S. PATENT DOCUMENTS

| | | | |
|---|---|---|---|
| 7,739,008 B2 * | 6/2010 | Cieler et al. | 701/36 |
| 2002/0091479 A1 * | 7/2002 | Maruko et al. | 701/96 |
| 2007/0005213 A1 * | 1/2007 | Nou et al. | 701/70 |
| 2007/0279199 A1 | 12/2007 | Danz et al. | |
| 2007/0282499 A1 * | 12/2007 | Maeda et al. | 701/41 |
| 2008/0027627 A1 | 1/2008 | Ikeda et al. | |
| 2009/0058677 A1 | 3/2009 | Tseng et al. | |

FOREIGN PATENT DOCUMENTS

| | | |
|---|---|---|
| DE | 42 28 794 A1 | 3/1994 |
| EP | 0 835 796 A2 | 4/1998 |
| EP | 1 878 615 A1 | 1/2008 |
| EP | 2 026 099 A1 | 2/2009 |
| JP | 10-114273 A | 5/1998 |
| JP | 2001-199257 A | 7/2001 |
| JP | 2002-002423 A | 1/2002 |
| JP | 2002-019485 A | 1/2002 |
| JP | 2002-154349 A | 5/2002 |
| JP | 3400484 B2 | 4/2003 |
| JP | 2004-351992 A | 12/2004 |
| JP | 2005-056336 A | 3/2005 |
| WO | WO 2005/051709 A1 | 6/2005 |

* cited by examiner

VEHICLE CONTROL SYSTEM

TECHNICAL FIELD

The present invention relates to a vehicle control system which implements vehicle control for preventing a collision between an own vehicle and another vehicle approaching the own vehicle.

BACKGROUND ART

Conventionally, such a vehicle control system is known: when an own vehicle is to be parted by reversely moving the own vehicle, the vehicle control system changes a sensing area of an obstacle according to a steering angle to thereby sense the obstacle having a possibly to contact the own vehicle and then in the case that the distance between the thus sensed obstacle and the own vehicle is less than or equal to a certain distance, the vehicle control system implements a braking control. In general, in the case that the obstacle is another vehicle approaching the own vehicle, it is desirable to implement the braking control as early as possible when the own vehicle senses the approaching vehicle. In the case of prompting the timing of implementing the braking control, however, a driver may feel cumbersomeness or discomfort with respect to the braking control since the braking control is implemented even in such a scene where the following possibility is high: the driver wishes to end a reverse movement operation as early as possible when, for example, a space for allowing the approaching vehicle to pass by is not present at the back of the own vehicle.

In view of the above problems, it is an object of the present invention to provide a vehicle control system capable of implementing a proper vehicle control suited for the travel scene.

PRIOR ART LITERATURE

[Patent Literature]
Patent Literature 1: Japanese Patent Application Laid-Open No. 2004-351992

SUMMARY OF THE INVENTION

In the case that an own vehicle is sensed to be making a reverse movement, the vehicle control system according to the present invention sets a braking control operation distance according to an angle formed by the own vehicle's proceeding direction and an extending direction of a road on which an approaching vehicle is traveling.

MODE FOR CARRYING OUT THE INVENTION

Figure 1:
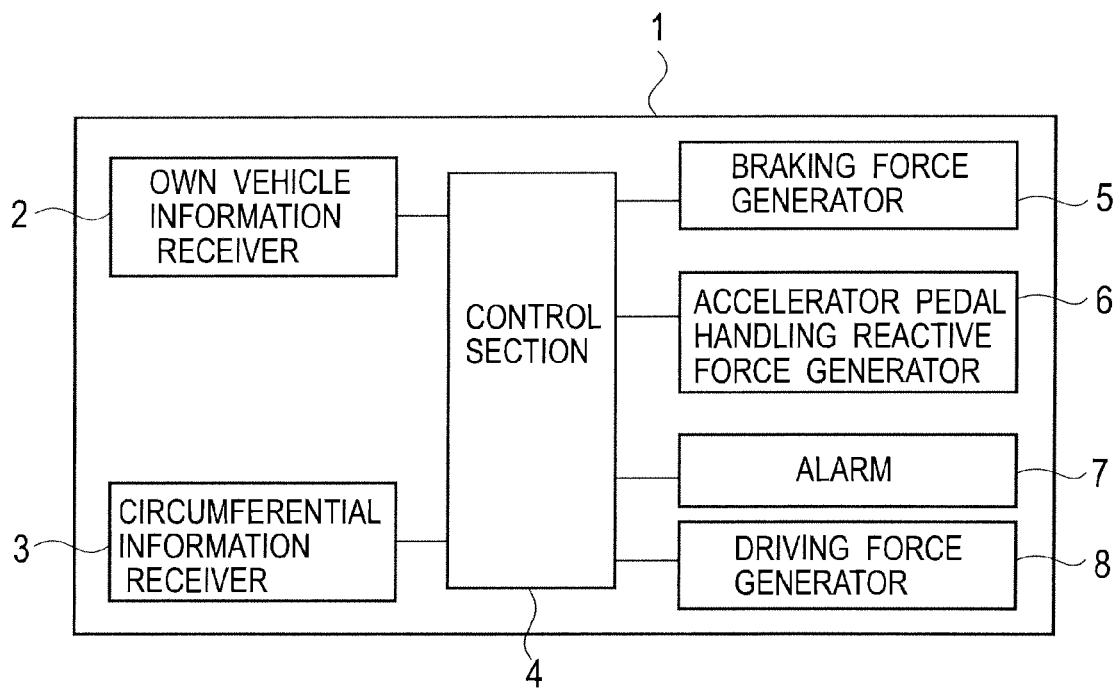
FIG. 1 is a block diagram showing a structure of a vehicle control system, according to an embodiment of the present invention.

Hereinafter, referring to the drawings, the structure of a vehicle control system according to an embodiment of the present invention is to be set forth.

[Structure of Vehicle Control System]

Figure 2:
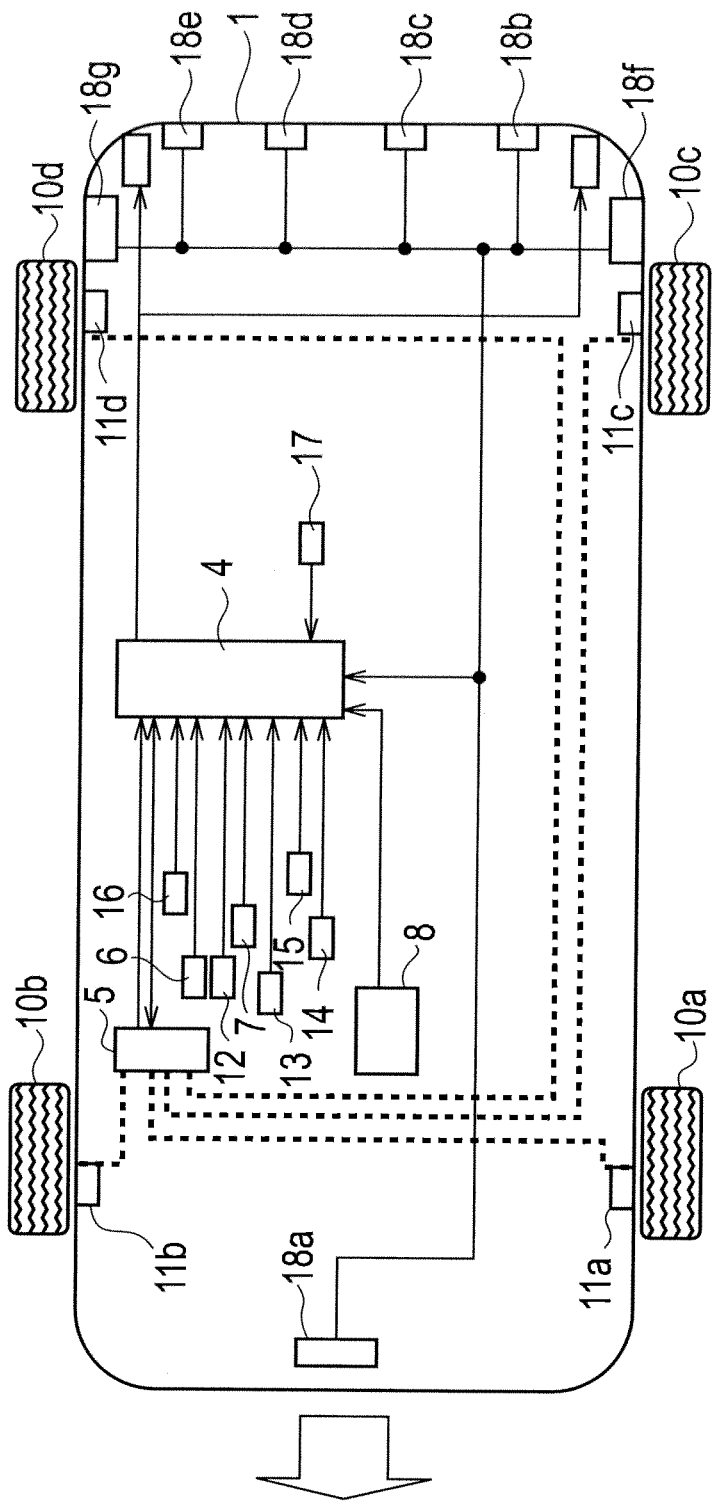
FIG. 2 is a schematic showing an example of a vehicle layout of the vehicle control system shown in FIG. 1.

The vehicle control system according to the embodiment of the present invention is, as shown in FIG. 1, installed in a vehicle 1, and is provided with main components including an own vehicle information receiver 2, a circumferential information receiver 3, a control section 4, a breaking force generator 5, an accelerator pedal handing reactive force generator 6, an alarm 7 and a driving force generator 8. As shown in FIG. 2, the own vehicle information receiver 2 is provided with: vehicle speed sensors 11a to 11d disposed at respective driving wheels 10a to 10d of the vehicle 1, an accelerator opening sensor 12 disposed at an accelerator pedal of the vehicle 1, a brake pedal switch 13 disposed at a brake pedal of the vehicle 1, a shift position sensor 14 (reverse movement sensor) for sensing a position of a transmission (shift position) of the vehicle 1, a switch sensor 15 for sensing conditions of a switch for turning on and off the vehicle control system installed in the vehicle 1, a steering sensor 16 for sensing a steering angle of a steering wheel of the vehicle 1 and an acceleration-deceleration sensor 17 for sensing acceleration-deceleration of the vehicle 1. Using the above sensors and switches, the own vehicle information receiver 2 receives, as own vehicle information, the wheel speed, accelerator opening, on-and-off conditions of brake pedal, shift position, switch conditions (turning on and off) of vehicle control system, steering angle (proceeding direction of the vehicle 1) and acceleration-deceleration of the vehicle 1.

The circumferential information receiver 3 is, as shown in FIG. 2, provided with obstacle sensors 18a to 18g disposed at front, back and right and left side backs of the vehicle 1, a not-shown navigation system and a not-shown GPS (Global Positioning system). As circumferential information, the circumferential information receiver 3 receives whether or not an obstacle is present at front, back and right and left side backs of the vehicle 1, the vehicle 1's distance and speed relative to the obstacle, and a sensed angle of the obstacle. The control section 4 includes a calculation processor such as ECU (Electric Control Unit) and controls operation of the entire vehicle control system in such a manner that a CPU in the calculation processor implements a computer program stored in advance. The braking force generator 5 controls a brake pressure of the vehicle 1 according to the control by the control section 4. The accelerator pedal handing reactive force generator 6 controls a scale of a handling reactive force of the accelerator pedal according to the control by the control section 4. The alarm 7 controls on-and-off of an alarm output according to the control by the control section 4. The driving force generator 8 controls an engine output of the vehicle 1 according to the control by the control section 4.

When the vehicle 1 makes a reverse movement, the vehicle control system having the above structure implements the following vehicle control process, to thereby implement a proper vehicle control suited for the travel scene. Hereinafter, referring to a flowchart shown in FIG. 3, operations of the vehicle control system when implementing the vehicle control process are to be set forth.

[Vehicle Control Process]

Figure 3:
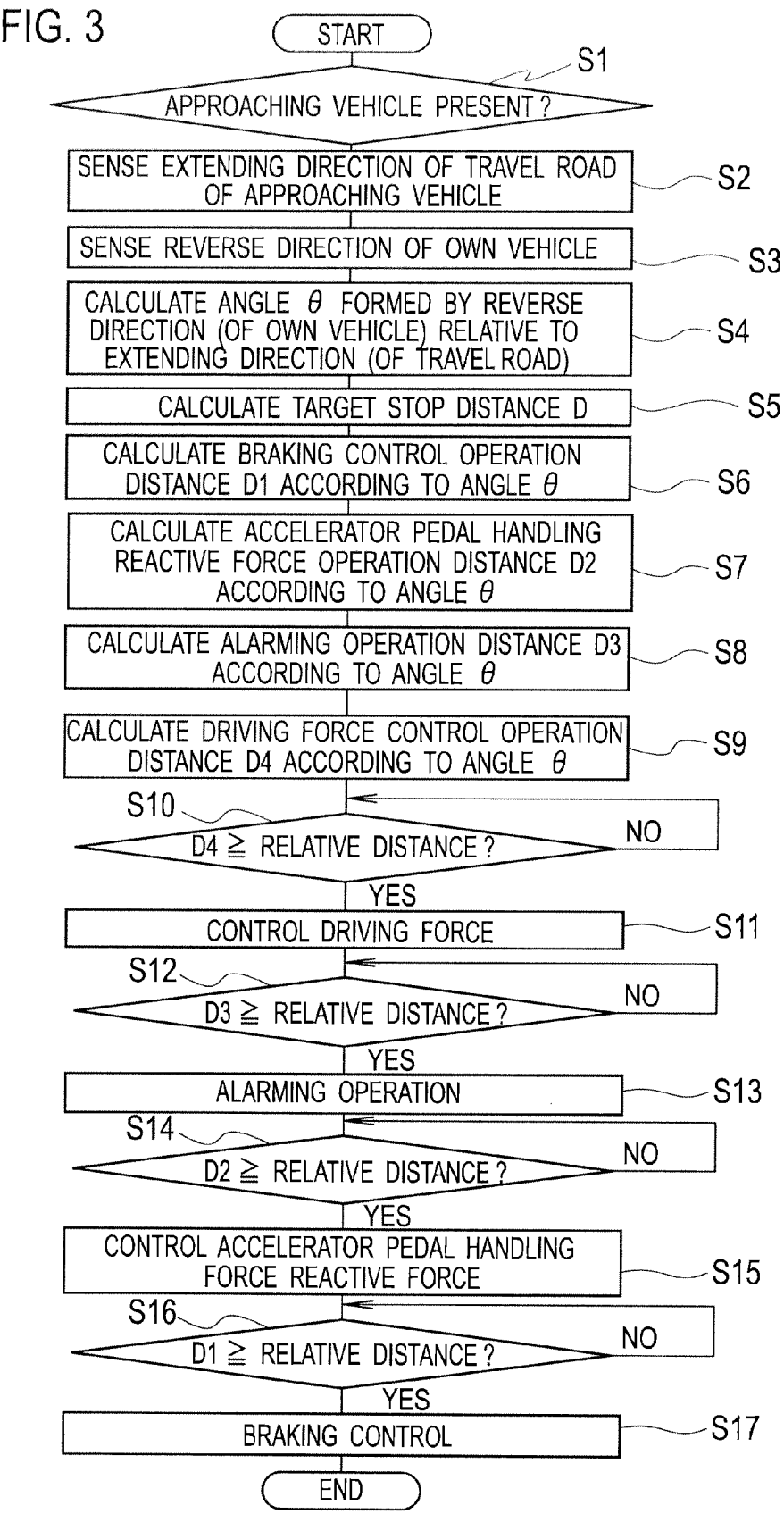
FIG. 3 is a flowchart showing a flow of vehicle control process, according to the embodiment of the present invention.

The flowchart shown in FIG. 3 starts at a timing when the control section 4 determines, based on the own vehicle information received by the own vehicle information receiver 2, that the switch for turning on and off the vehicle control system is turned on and that the shift position of the vehicle 1 is in an R (reverse) position. Then, the vehicle control process proceeds to a process at a step S1. Herein, this vehicle control process is to be repeated at a certain control period as long as the switch for turning on and off the vehicle control system is turned on and that the shift position of the vehicle 1 is in the R position. Moreover, the timing for starting the vehicle control process is not limited to the above, for example, conditions such as the vehicle speed less than or equal to a certain value or the steering angle less than or equal to a certain value and the like may be added.

In the process at step S1, based on the circumferential information received by the circumferential information receiver 3, the control section 4 determines whether or not another vehicle (obstacle) approaching the vehicle 1 is present. Herein, according to this embodiment, the obstacle sensed by the obstacle sensors 18a to 18g is handled as a vehicle. However, for example, only an obstacle moving at a certain speed may be sensed as a vehicle. Then, at a timing of determining that the approaching vehicle is present, the control section 4 allows the vehicle control process to proceed to a process at a step S2.

Figure 4:
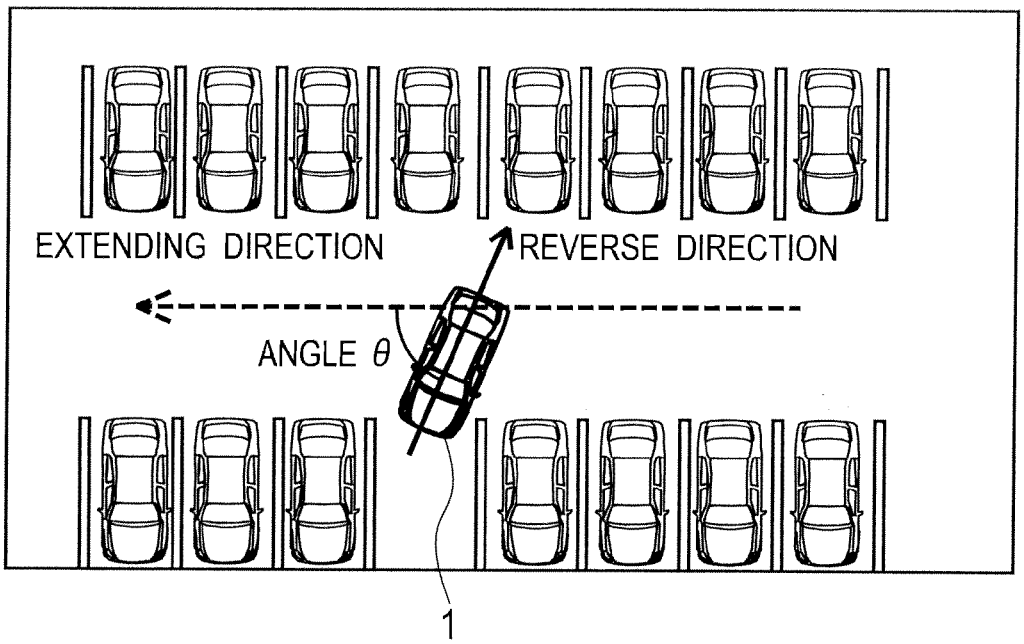
FIG. 4 is a drawing showing an angle $\theta$ formed by a proceeding direction of a vehicle relative to an extending direction of a road on which an approaching vehicle is traveling.

In the process at step S2, as shown in FIG. 4, the control section 4 senses, via the circumferential information receiver 3, an extending direction of a road on which the approaching vehicle is traveling. With this, the process at step S2 is ended and then the vehicle control process proceeds to the process at a step S3. Herein, from the road configuration of the vehicle surroundings which configuration is memorized in the navigation system, the circumferential information receiver 3 may sense the extending direction of the road on which the approaching vehicle is traveling. Otherwise, by the following operations, the circumferential information receiver 3 may determine the extending direction of the road on which the approaching vehicle is traveling: sensing the approaching vehicle's position with the obstacle sensors 18a to 18g and then sensing the approaching vehicle's moving direction in view of position changes and the like of the approaching vehicle.

In the process at step S3, via the own vehicle information receiver 2, the control section 4 senses the vehicle 1's proceeding direction (reverse direction). With this, the process at step S3 is ended, and then the vehicle control process proceeds to the process at a step S4.

Figure 5:
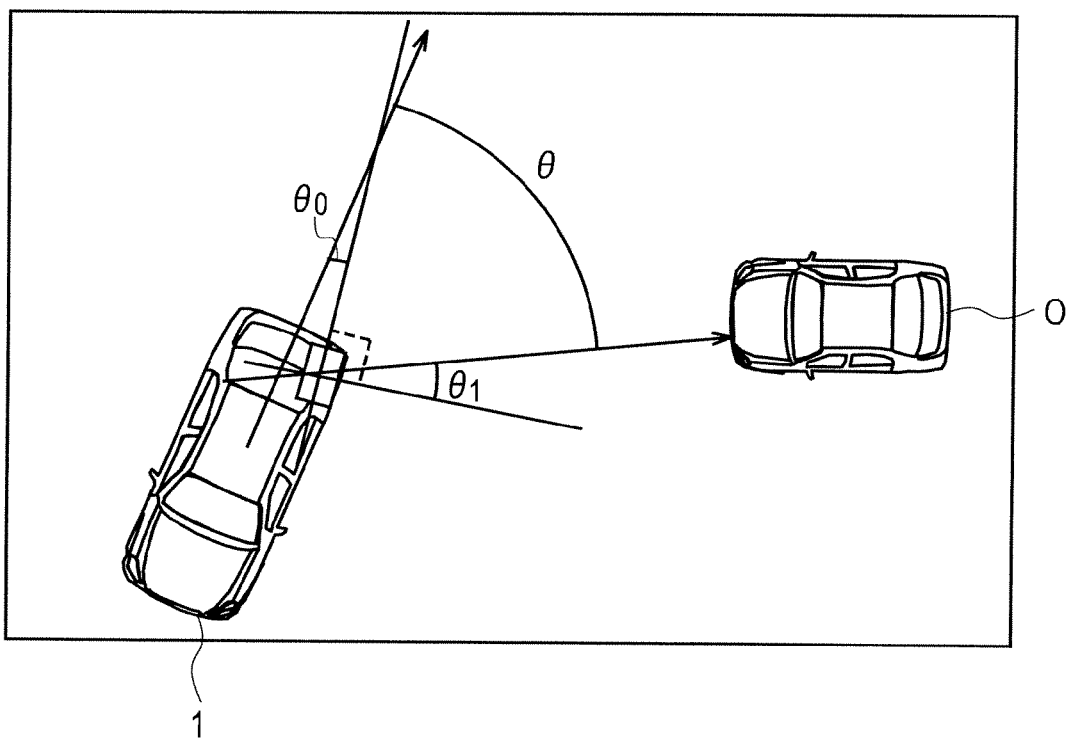
FIG. 5 is a drawing for explaining how to calculate the angle $\theta$ by using a sensed angle of an obstacle.

In the process at step S4, the control section 4 calculates an angle θ formed by the vehicle's proceeding direction sensed by the process of the step S3 relative to the extending direction (of the travel road of the approaching vehicle) sensed by the process at step S2. Herein, the control section 4 may otherwise calculate the angle θ by using the obstacle's sensed angle $\theta_1$ sensed by means of the circumferential information receiver 3. That is, in this case, the control section 4, as shown in FIG. 5, calculates the angle θ by substituting a mounting angle $\theta_0$ (of the obstacle sensor relative to the forward-reverse direction of the vehicle 1) and the obstacle's sensed angle θ1 for an expression $\theta = 90 - \theta_0 - \theta_1$. With this, the process at step S4 is ended and then the vehicle control process proceeds to the process at a step S5.

In the process at step S5, the control section 4 sets a certain target stop distance D relative to the obstacle sensed by the process at step S1. With this, the process at step S5 is ended, and then the vehicle control process proceeds to the process at a step S6.

Figure 6:
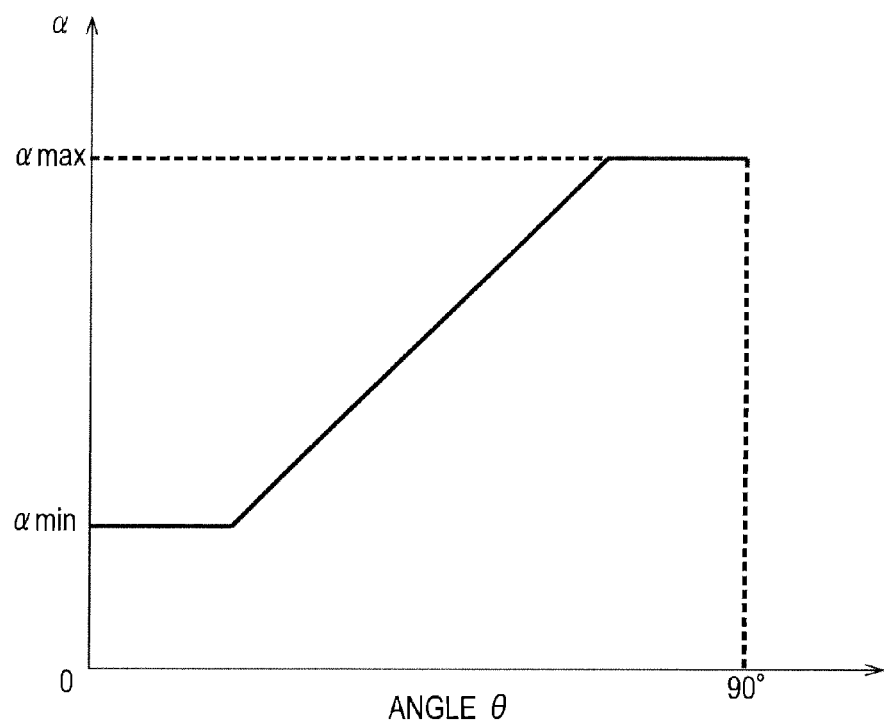
FIG. 6 is a drawing showing the change of a gain $\alpha$ used for calculating a braking control operation distance, the gain $\alpha$ being associated with the change of the angle $\theta$.

In the process at step S6, the control section 4 multiplies the target stop distance D (set by the process at step S5) by a gain α (according to the angle θ calculated by the process at step S4), to thereby calculate a braking control operation distance D1 for starting control of the brake pressure of the vehicle 1. Herein, as shown in FIG. 6, the gain α becomes larger as the angle θ is closer to 90° while the gain α becomes smaller as the angle θ is closer to 0°. Therefore, the closer the angle θ is to 90° the longer the braking control operation distance D1 is while the closer the angle θ is to 0° the shorter the braking control operation distance D1 is. With this, the process at step S6 is ended and then the vehicle control process proceeds to the process at a step S7.

In the process at step S7, the control section 4 multiplies the braking control operation distance D1 (calculated by the process at step S6) by a gain α1 (according to the angle θ), to thereby calculate an accelerator pedal handing reactive force operation distance D2 for starting the control of the accelerator pedal handing reactive force of the vehicle 1. Herein, the gain α1 is set more than or equal to the gain α in the process at step S6 and less than or equal to a gain α2 in the process at a step 8 such that the scale of the accelerator pedal handing reactive force operation distance D2 is more than or equal to the braking control operation distance D1 and less than or equal to an alarming operation distance D3. With this, the process at step S7 is ended and then the vehicle control process proceeds to the process at the step S8.

In the process at step S8, the control section 4 multiplies the braking control operation distance D1 (calculated by the process at step S6) by the gain α2 (according to the angle θ), to thereby calculate the alarming operation distance D3 for starting the alarming operation for informing a driver of the presence of the obstacle. Herein, the gain α2 is set more than or equal to the gain α1 in the process at step S7 and less than or equal to a gain α3 in the process at a step S9 such that the scale of the alarming operation distance D3 is more than or equal to the accelerator pedal handing reactive force operation distance D2 and less than or equal to an after-described driving force control operation distance D4. With this, the process at step S8 is ended and then the vehicle control process proceeds to the process at a step S9.

In the process at step S9, the control section 4 multiplies the braking control operation distance D1 (calculated by the process at step S6) by the gain α3 (according to the angle θ), to thereby calculate the driving force control operation distance D4 for starting control of the engine output of the vehicle 1. Herein, the gain α3 is set more than or equal to the gain α2 in the process at step S8 such that the scale of the driving force control operation distance D4 is more than or equal to the alarming operation distance D3. With this, the process at step S9 is ended and then the vehicle control process proceeds to the process at a step S10.

In the process at step S10, the control section 4 determines whether or not the distance (relative to the obstacle) sensed by the circumferential information receiver 3 is less than or equal to the driving force control operation distance D4 calculated by the process at step S9. Then, at a timing when the distance (relative to the obstacle) sensed by the circumferential information receiver 3 is less than or equal to the driving force control operation distance D4, the control section 4 allows the vehicle control process to proceed to the process at a step S11.

Figure 7:
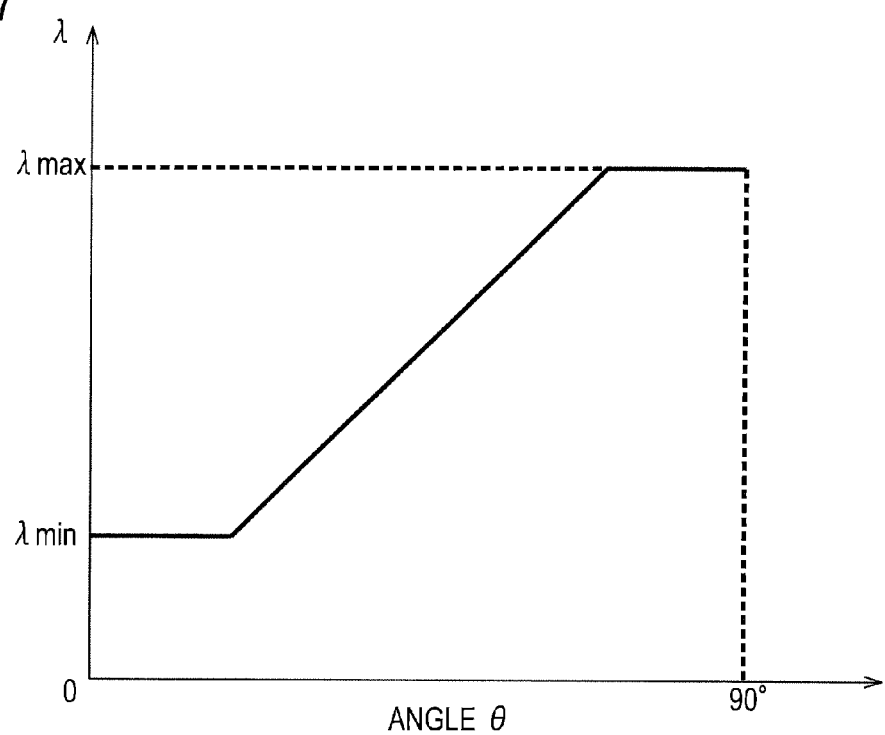
FIG. 7 is a drawing showing the change of a change ratio $\lambda$ of an accelerator opening reduction quantity, the change ratio $\lambda$ being associated with the change of the angle $\theta$.

In the process at step S11, the control section 4 controls the driving force generator 8 to thereby increase an accelerator opening reduction quantity at a certain change ratio, and at a timing when a certain accelerator opening reduction quaintly is reached, the control section 4 maintains the certain accelerator opening reduction quantity. Then, after an elapse of a certain time, the control section 4 decreases the accelerator opening reduction quaintly to 0. Herein, the control section 4 may use a value λ as a change ratio of the accelerator opening reduction quaintly, where the value λ becomes larger as the angle θ is closer to 90° while the value λ becomes smaller as the angle θ is closer to 0°, as shown in FIG. 7. With such processes, the smaller the angle θ is, the smaller the accelerator opening reduction quaintly can be made, to thereby decrease discomfort which the driver may feel. Moreover, in the above processes, the final throttle opening of the engine is calculated by reducing the accelerator opening reduction quantity from the accelerator opening by the driver's operation. With this, the process at step S11 is ended and then the vehicle control process proceeds to the process at a step S12.

In the process at step S12, the control section 4 determines whether or not the distance (relative to the obstacle) sensed by the circumferential information receiver 3 is less than or equal to the alarming operation distance D3 calculated by the process at step S8. Then, at a timing when the distance (relative to the obstacle) sensed by the circumferential information receiver 3 is less than or equal to the alarming operation distance D3, the control section 4 allows the vehicle control process to proceed to a step S13.

Figure 8:
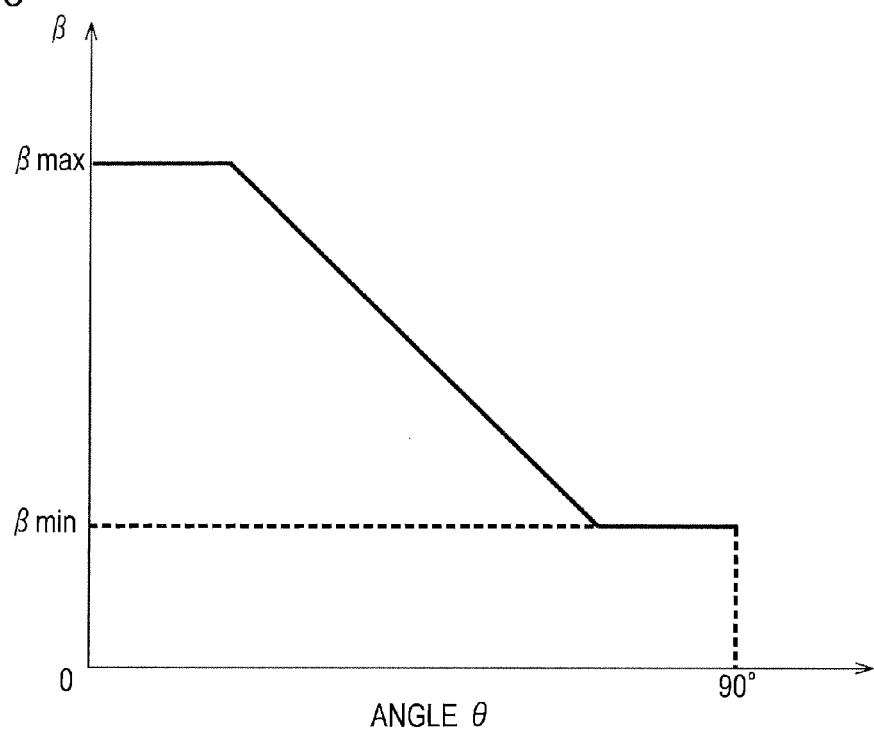
FIG. 8 is a drawing showing the change of a time interval $\beta$ of on-and-off of an output of an alarming information, the time interval $\beta$ being associated with the change of the angle $\theta$.

In the process at step S13, the control section 4 controls the alarm 7, to thereby output alarming information (buzzer sound) for informing the driver of the presence of the obstacle. Herein, as shown in FIG. 8, according to the angle θ, the control section 4 may change a time interval β of turning on and off the output of the alarming information. Specifically, in the example shown in FIG. 8, the time interval β becomes shorter as the angle θ is closer to 90° while the time interval β becomes longer as the angle θ is closer to 0°. The above process can decrease the cumbersomeness which may be felt by the driver with respect to the alarming information. Moreover, the control section 4 may change an output form (i.e., sound volume) of the alarming information according to the angle θ. With this, the process at step S13 is ended and then the vehicle control process proceeds to the process at a step S14.

In the process at step S14, the control section 4 determines whether or not the distance (relative to the obstacle) sensed by the circumferential information receiver 3 is less than or equal to the accelerator pedal handing reactive force operation distance D2 calculated by the process at step S7. Then, at a timing when the distance (relative to the obstacle) sensed by the circumferential information receiver 3 is less than or equal to the accelerator pedal handing reactive force operation distance D2, the control section 4 allows the vehicle control process to proceed to a step S15.

Figure 9:
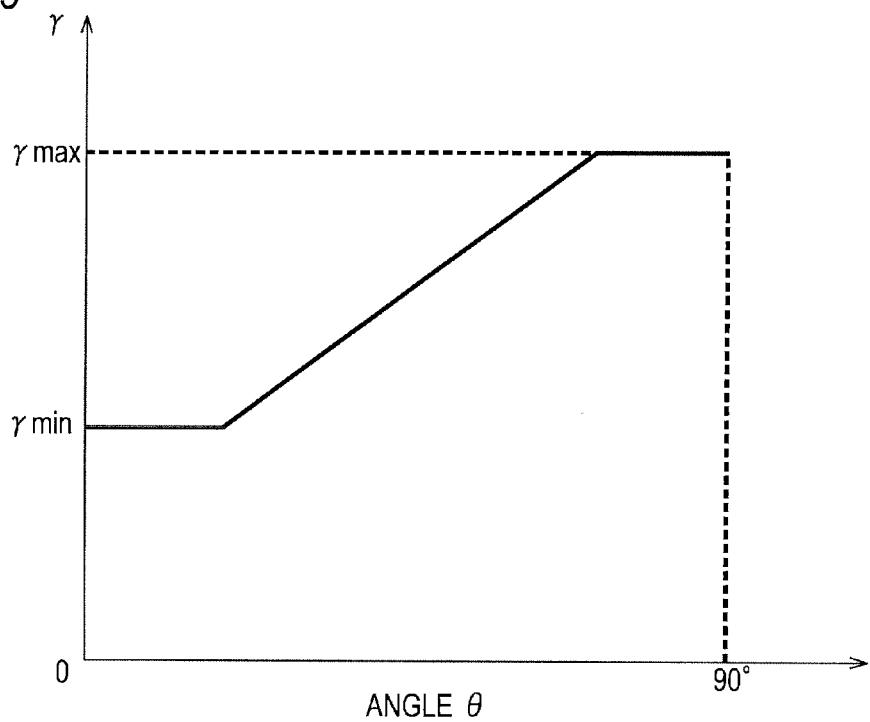
FIG. 9 is a drawing showing the change of a change ratio $\gamma$ of an accelerator pedal handing reactive force, the change ratio $\gamma$ being associated with the change of the angle $\theta$.

In the process at step S15, the control section 4 controls the accelerator pedal handing reactive force generator 6, to thereby increase the accelerator pedal handing reactive force at a certain change ratio. Then, at a timing when a certain accelerator pedal handing reactive force is reached, the control section 4 maintains the certain accelerator pedal handing reactive force. Herein, the control section 4 may use a value γ as a change ratio of the accelerator pedal handling reactive force, where the value γ becomes larger as the angle θ is closer to 90° while the value γ becomes smaller as the angle θ is closer to 0°, as shown in FIG. 9. In the above process, the smaller the angle θ is, the smaller the accelerator pedal handing reactive force can be made, thereby decreasing the discomfort which the driver may feel. With this, the process at step S15 is ended, and then the vehicle control process proceeds to the process at a step S16.

In the process at step S16, the control section 4 determines whether or not the distance (relative to the obstacle) sensed by the circumferential information receiver 3 is less than or equal to the braking control operation distance D1 calculated by the process at step S6. Then, at a timing when the distance (relative to the obstacle) sensed by the circumferential information receiver 3 is less than or equal to the braking control operation distance D1, the control section 4 allows the vehicle control process to proceed to a step S17.

In the process at step S17, the control section 4 controls the braking force generator 5, to thereby increase a target brake pressure at a certain change ratio. Then, at a timing when a certain target brake pressure is reached, the control section 4 maintains the thus reached target brake pressure. Then, after an elapse of a certain time after the vehicle speed is 0, the control section 4 decreases the brake pressure to 0 at a certain change ratio. Herein, the certain change ratio and the certain target brake pressure each may be changed according to the wheel speed as well as the relative-to-obstacle distance. With this, the process at step S17 is ended and then a series of vehicle control processes are ended.

Figure 10:
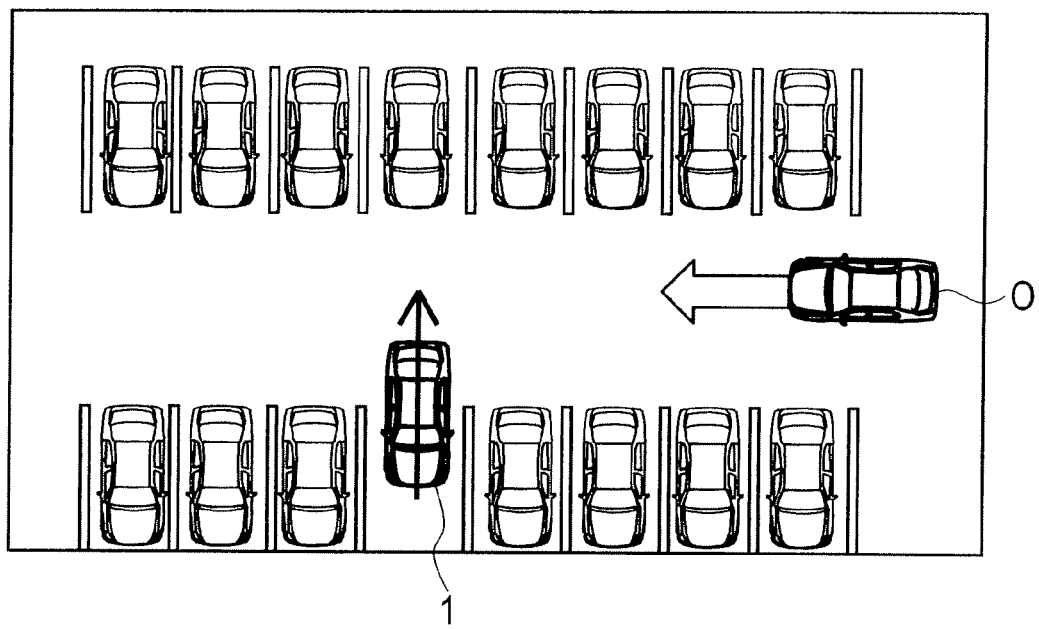
FIG. 10 is a drawing showing a travel scene where an approaching vehicle is sensed when the vehicle is making a reverse movement.
Figure 11:
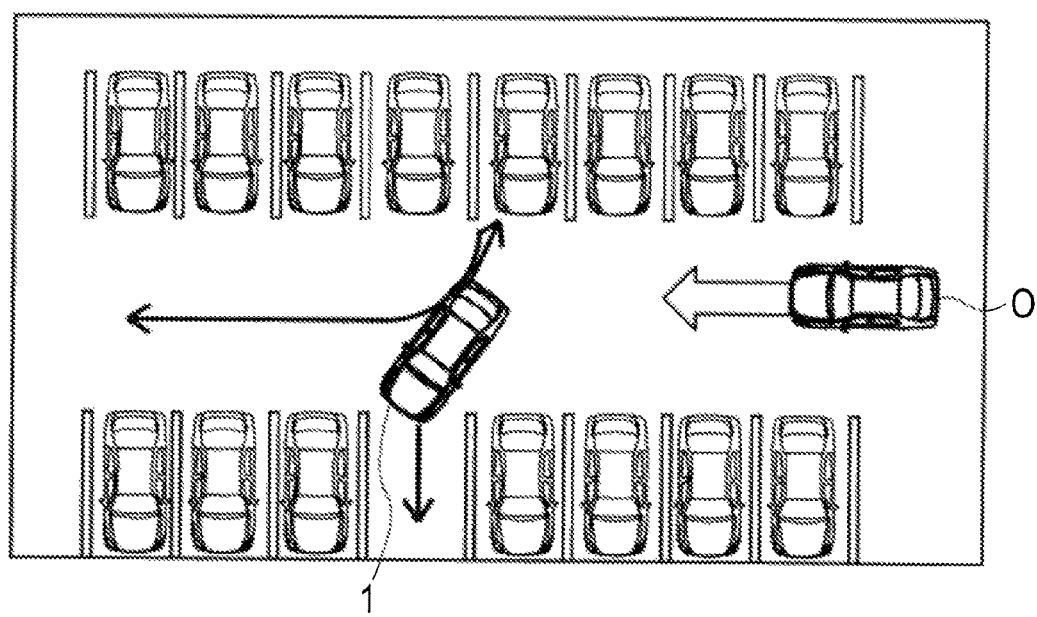
FIG. 11 is a drawing showing a scene where a space for allowing the approaching vehicle to pass by is not present at the back of the vehicle and the possibility that a driver wishes to end the reverse movement operation as early as possible is high.

As obvious from the above descriptions, with the vehicle control process according to the embodiment of the present invention, when the vehicle 1 is in the process of making the reverse movement, the control section 4 sets the braking control operation distance according to the angle θ formed by the vehicle 1's proceeding direction relative to the extending direction of the travel road of the approaching vehicle. Then, with the above vehicle control process, the braking control is implemented at an early timing in the case that an approaching vehicle O is sensed when the vehicle 1 is making the reverse movement, as shown in FIG. 10, while the braking control is implemented at a delayed timing in a scene where the following possibility is high: the driver wishes to end the reverse movement operation as early as possible when a space for allowing the approaching vehicle to pass by is not present at the back of the vehicle 1, as shown in FIG. 11. Thereby, a proper vehicle control suited for the travel scene can be implemented.

As set forth above, the embodiment to which the present invention implemented by the present inventors is applied has been explained, however, the present invention is not limited to the descriptions and drawings (according to the embodiment) which are a part of the disclosure of the present invention. Namely, all other embodiments, examples, operational technologies and the like which can be implemented by a person(s) skilled in the art based on the embodiment are included within the scope of the present invention.

This application claims priority based on the Japanese Patent Application No. 2008-196599 filed on Jul. 30, 2008. The entire contents of this application are incorporated herein by reference.

[Industrial Applicability]

The present invention is applicable to a vehicle control system for implementing a vehicle control for preventing collision between an own vehicle and another vehicle approaching the own vehicle.

The invention claimed is:

1. A vehicle control system for implementing a vehicle control for preventing an own vehicle from having a contact with another vehicle approaching the own vehicle, the vehicle control system comprising:
   an approaching vehicle sensor for sensing:
      whether or not the approaching vehicle is present, and
      a distance between the own vehicle and the approaching vehicle;
   an extending direction sensor for sensing an extending direction of a road on which the approaching vehicle sensed by the approaching vehicle sensor is traveling;
   an own vehicle proceeding direction sensor for sensing a proceeding direction of the own vehicle;
   a reverse movement sensor for sensing that the own vehicle is making a reverse movement;
   a braking section for applying a braking force to the own vehicle in a case that the distance which is sensed by the approaching vehicle sensor and is defined between the own vehicle and the approaching vehicle is less than or equal to a braking control operation distance which is a certain distance; and
   a control section for setting the braking control operation distance according to an angle formed by:
      the proceeding direction sensed by the own vehicle proceeding direction sensor, and
      the extending direction sensed by the extending direction sensor,
      wherein the setting operation is implemented in a case that the reverse movement sensor senses that the own vehicle is making the reverse movement.

2. The vehicle control system according to claim 1, wherein the control section increases the braking control operation distance according to that the angle formed by the proceeding direction sensed by the own vehicle proceeding direction sensor and the extending direction sensed by the extending direction sensor is closer to 90°.

3. The vehicle control system according to claim 1, wherein the control section decreases the braking control operation distance according to that the angle formed by the proceeding direction sensed by the own vehicle proceeding direction sensor and the extending direction sensed by the extending direction sensor is closer to 0°.

4. The vehicle control system according to claim 1, wherein
   the approaching vehicle sensor senses an angle of the approaching vehicle relative to the own vehicle,
   the control section uses the angle of the approaching vehicle sensed by the approaching vehicle sensor, to thereby calculate the angle formed by the proceeding direction sensed by the own vehicle proceeding direction sensor and the extending direction sensed by the extending direction sensor.

5. The vehicle control system according to claim 1, further comprising:
   an alarm section for informing a driver of an approaching obstacle in a case that the distance which is sensed by the approaching vehicle sensor and is defined between the own vehicle and the approaching vehicle is less than or equal to an alarming operation distance which is a certain distance greater than the braking control operation distance,
   wherein
   according to the angle formed by the proceeding direction sensed by the own vehicle proceeding direction sensor and the extending direction sensed by the extending direction sensor, the alarm section changes the alarming operation distance.

6. The vehicle control system according to claim 5, wherein
   according to the angle formed by the proceeding direction sensed by the own vehicle proceeding direction sensor and the extending direction sensed by the extending direction sensor, the control section changes an alarming form of the alarm section.

7. The vehicle control system according to claim 1, further comprising:
   an accelerator pedal handling reactive force generator for generating a handling reactive force to an accelerator pedal of the own vehicle in a case that the distance which is sensed by the approaching vehicle sensor and is defined between the own vehicle and the approaching vehicle is less than or equal to an accelerator pedal handling reactive force operation distance which is a certain distance greater than the braking control operation distance,
   wherein
   according to the angle formed by the proceeding direction sensed by the own vehicle proceeding direction sensor and the extending direction sensed by the extending direction sensor, the accelerator pedal handling reactive force generator changes the accelerator pedal handling reactive force operation distance.

8. The vehicle control system according to claim 7, wherein
   according to the angle formed by the proceeding direction sensed by the own vehicle proceeding direction sensor and the extending direction sensed by the extending direction sensor, the control section changes a scale of the handling reactive force generated by the accelerator pedal handling reactive force generator.

9. The vehicle control system according to claim 1, further comprising:
   a driving force generator for controlling a driving force of the own vehicle in a case that the distance which is sensed by the approaching vehicle sensor and is defined between the own vehicle and the approaching vehicle is less than or equal to a driving force control operation distance which is a certain distance greater than the braking control operation distance,
   wherein
   according to the angle formed by the proceeding direction sensed by the own vehicle proceeding direction sensor and the extending direction sensed by the extending direction sensor, the control section changes the driving force control operation distance.

10. The vehicle control system according to claim 9, wherein
   according to the angle formed by the proceeding direction sensed by the own vehicle proceeding direction sensor and the extending direction sensed by the extending direction sensor, the control section changes a scale of the driving force generated by the driving force generator.

11. The vehicle control system according to claim 1, further comprising:
- an accelerator pedal handling reactive force generator for generating a handling reactive force to an accelerator pedal of the own vehicle in a case that the distance which is sensed by the approaching vehicle sensor and is defined between the own vehicle and the approaching vehicle is less than or equal to an accelerator pedal handling reactive force operation distance which is a certain distance greater than the braking control operation distance,
- an alarm section for alarming a driver of an approaching obstacle in a case that the distance which is sensed by the approaching vehicle sensor and is defined between the own vehicle and the approaching vehicle is less than or equal to an alarming operation distance which is a certain distance greater than the accelerator pedal handling reactive force operation distance, and
- a driving force generator for controlling a driving force of the own vehicle in a case that the distance which is sensed by the approaching vehicle sensor and is defined between the own vehicle and the approaching vehicle is less than or equal to a driving force control operation distance which is a certain distance greater than the accelerator pedal handling reactive force operation distance.

* * * * *